US008909545B2

(12) United States Patent
Vieri

(10) Patent No.: US 8,909,545 B2
(45) Date of Patent: *Dec. 9, 2014

(54) SYSTEM TO GENERATE AND SET UP AN ADVERTISING CAMPAIGN BASED ON THE INSERTION OF ADVERTISING MESSAGES WITHIN AN EXCHANGE OF MESSAGES, AND METHOD TO OPERATE SAID SYSTEM

(71) Applicant: Braintexter, Inc., Austin, TX (US)

(72) Inventor: Riccardo Vieri, Montespertoli (IT)

(73) Assignee: Braintexter, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/710,124

(22) Filed: Dec. 10, 2012

(65) Prior Publication Data

US 2013/0103501 A1   Apr. 25, 2013

Related U.S. Application Data

(63) Continuation of application No. 12/018,889, filed on Jan. 24, 2008, now Pat. No. 8,359,234.

(51) Int. Cl.
*G06Q 30/00* (2012.01)
*G06Q 30/02* (2012.01)
*G06Q 10/10* (2012.01)

(52) U.S. Cl.
CPC ............ *G06Q 30/0251* (2013.01); *G06Q 30/00* (2013.01); *G06Q 10/107* (2013.01); *G06Q 30/02* (2013.01); *G06Q 30/0256* (2013.01); *G06Q 30/0277* (2013.01)
USPC .................. 705/14.49; 705/14.58; 705/14.64; 705/14.66; 705/14.67; 705/14.68

(58) Field of Classification Search
USPC .......... 705/14.49, 14.58, 14.64, 14.66, 14.67, 705/14.68
See application file for complete search history.

(56) References Cited

U.S. PATENT DOCUMENTS 4,615,081 A   10/1986   Lindahl
4,974,191 A   11/1990   Amirghodsi et al.
(Continued)

FOREIGN PATENT DOCUMENTS

EP   0 946 032 A3   9/1999
EP   0946032 A2   9/1999
(Continued)

OTHER PUBLICATIONS

Factors That Influence the Effectiveness of Mobile Advertising: The Case of SMS; Dimitris Drossos and George M. Giaglis; 2005; 8-pages.*

(Continued)

*Primary Examiner* — Gregory Johnson
(74) *Attorney, Agent, or Firm* — Toler Law Group, PC

(57) ABSTRACT

A method includes receiving message data at a server from a first remote device. The message data is associated with a message to a second remote device and includes text. The method includes parsing the message data to identify information associated with an advertisement of an advertisement campaign. The advertisement includes advertisement text and a graphical image that corresponds to a pre-recorded audio message. The method includes generating an audio file based on the message data, the advertisement text, and the pre-recorded audio message, and sending the audio file from the server to the second remote device.

20 Claims, 11 Drawing Sheets

(56) References Cited

U.S. PATENT DOCUMENTS

| | | | |
|---|---|---|---|
| 5,128,672 | A | 7/1992 | Kaehler |
| 5,282,265 | A | 1/1994 | Rohra Suda et al. |
| 5,386,556 | A | 1/1995 | Hedin et al. |
| 5,434,777 | A | 7/1995 | Luciw |
| 5,479,488 | A | 12/1995 | Lenning et al. |
| 5,577,241 | A | 11/1996 | Spencer |
| 5,608,624 | A | 3/1997 | Luciw |
| 5,682,539 | A | 10/1997 | Conrad et al. |
| 5,727,950 | A | 3/1998 | Cook et al. |
| 5,748,974 | A | 5/1998 | Johnson |
| 5,794,050 | A | 8/1998 | Dahlgren et al. |
| 5,826,261 | A | 10/1998 | Spencer |
| 5,852,809 | A | 12/1998 | Abel et al. |
| 5,895,466 | A | 4/1999 | Goldberg et al. |
| 5,899,972 | A | 5/1999 | Miyazawa et al. |
| 5,915,249 | A | 6/1999 | Spencer |
| 5,937,392 | A * | 8/1999 | Alberts ............... 705/14.52 |
| 5,950,123 | A | 9/1999 | Schwelb et al. |
| 5,987,404 | A | 11/1999 | Della Pietra et al. |
| 5,995,590 | A | 11/1999 | Brunet et al. |
| 6,052,656 | A | 4/2000 | Suda et al. |
| 6,081,750 | A | 6/2000 | Hoffberg et al. |
| 6,088,731 | A | 7/2000 | Kiraly et al. |
| 6,144,938 | A | 11/2000 | Surace et al. |
| 6,163,809 | A | 12/2000 | Buckley |
| 6,188,999 | B1 | 2/2001 | Moody |
| 6,233,559 | B1 | 5/2001 | Balakrishnan |
| 6,334,103 | B1 | 12/2001 | Surace et al. |
| 6,351,522 | B1 | 2/2002 | Vitikainen |
| 6,389,114 | B1 | 5/2002 | Dowens et al. |
| 6,421,672 | B1 | 7/2002 | McAllister et al. |
| 6,421,707 | B1 | 7/2002 | Miller et al. |
| 6,434,524 | B1 | 8/2002 | Weber |
| 6,456,616 | B1 | 9/2002 | Rantanen |
| 6,501,937 | B1 | 12/2002 | Ho et al. |
| 6,513,063 | B1 | 1/2003 | Julia et al. |
| 6,523,008 | B1 * | 2/2003 | Avrunin et al. ............... 704/273 |
| 6,523,061 | B1 | 2/2003 | Halverson et al. |
| 6,526,395 | B1 | 2/2003 | Morris |
| 6,529,592 | B1 | 3/2003 | Khan |
| 6,532,444 | B1 | 3/2003 | Weber |
| 6,564,186 | B1 | 5/2003 | Kiraly et al. |
| 6,598,039 | B1 | 7/2003 | Livowsky |
| 6,601,026 | B2 | 7/2003 | Appelt et al. |
| 6,601,041 | B1 * | 7/2003 | Brown et al. ............... 705/14.61 |
| 6,603,837 | B1 | 8/2003 | Kesanupalli et al. |
| 6,615,172 | B1 | 9/2003 | Bennett et al. |
| 6,621,892 | B1 | 9/2003 | Banister et al. |
| 6,633,846 | B1 | 10/2003 | Bennett et al. |
| 6,650,735 | B2 | 11/2003 | Burton et al. |
| 6,665,640 | B1 | 12/2003 | Bennett et al. |
| 6,684,249 | B1 * | 1/2004 | Frerichs et al. ............... 709/225 |
| 6,691,111 | B2 | 2/2004 | Lazaridis et al. |
| 6,691,151 | B1 | 2/2004 | Cheyer et al. |
| 6,735,632 | B1 | 5/2004 | Kiraly et al. |
| 6,742,021 | B1 | 5/2004 | Halverson et al. |
| 6,757,362 | B1 | 6/2004 | Cooper et al. |
| 6,757,365 | B1 | 6/2004 | Bogard |
| 6,757,718 | B1 | 6/2004 | Halverson et al. |
| 6,760,412 | B1 | 7/2004 | Loucks |
| 6,763,089 | B2 | 7/2004 | Feigenbaum |
| 6,778,951 | B1 | 8/2004 | Contractor |
| 6,790,704 | B2 | 9/2004 | Doyle et al. |
| 6,792,082 | B1 | 9/2004 | Levine |
| 6,792,086 | B1 | 9/2004 | Saylor et al. |
| 6,801,604 | B2 | 10/2004 | Maes et al. |
| 6,807,574 | B1 | 10/2004 | Partovi et al. |
| 6,816,578 | B1 | 11/2004 | Kredo et al. |
| 6,842,767 | B1 | 1/2005 | Partovi et al. |
| 6,851,115 | B1 | 2/2005 | Cheyer et al. |
| 6,859,931 | B1 | 2/2005 | Cheyer et al. |
| 6,874,018 | B2 | 3/2005 | Wu |
| 6,895,084 | B1 | 5/2005 | Saylor et al. |
| 6,895,380 | B2 | 5/2005 | Sepe, Jr. |
| 6,895,558 | B1 | 5/2005 | Loveland |
| 6,907,112 | B1 | 6/2005 | Guedalia et al. |
| 6,928,614 | B1 | 8/2005 | Everhart |
| 6,931,255 | B2 | 8/2005 | Mekuria |
| 6,934,756 | B2 | 8/2005 | Maes et al. |
| 6,937,975 | B1 | 8/2005 | Elworthy |
| 6,950,502 | B1 | 9/2005 | Jenkins |
| 6,964,023 | B2 | 11/2005 | Maes et al. |
| 6,980,949 | B2 | 12/2005 | Ford |
| 6,996,531 | B2 | 2/2006 | Korall et al. |
| 7,024,460 | B2 | 4/2006 | Koopmas et al. |
| 7,027,568 | B1 | 4/2006 | Simpson et al. |
| 7,027,974 | B1 | 4/2006 | Busch et al. |
| 7,036,128 | B1 | 4/2006 | Julia et al. |
| 7,050,977 | B1 | 5/2006 | Bennett |
| 7,054,419 | B2 | 5/2006 | Culliss |
| 7,062,428 | B2 | 6/2006 | Hogenhout et al. |
| 7,065,185 | B1 | 6/2006 | Koch |
| 7,069,560 | B1 | 6/2006 | Cheyer et al. |
| 7,092,370 | B2 | 8/2006 | Jiang et al. |
| 7,092,928 | B1 | 8/2006 | Elad et al. |
| 7,095,733 | B1 | 8/2006 | Yarlagadda et al. |
| 7,113,803 | B2 | 9/2006 | Dehlin |
| 7,127,046 | B1 | 10/2006 | Smith et al. |
| 7,136,710 | B1 | 11/2006 | Hoffberg et al. |
| 7,137,126 | B1 | 11/2006 | Coffman et al. |
| 7,174,297 | B2 | 2/2007 | Guerra et al. |
| 7,184,786 | B2 * | 2/2007 | Mumick et al. ............... 455/466 |
| 7,200,559 | B2 | 4/2007 | Wang |
| 7,203,646 | B2 | 4/2007 | Bennett |
| 7,216,073 | B2 | 5/2007 | Lavi et al. |
| 7,216,080 | B2 | 5/2007 | Tsiao et al. |
| 7,233,904 | B2 | 6/2007 | Luisi |
| 7,277,854 | B2 | 10/2007 | Bennett et al. |
| 7,290,039 | B1 | 10/2007 | Lisitsa et al. |
| 7,310,329 | B2 | 12/2007 | Vieri et al. |
| 7,324,947 | B2 | 1/2008 | Jordan et al. |
| 7,349,953 | B2 | 3/2008 | Lisitsa et al. |
| 7,376,645 | B2 | 5/2008 | Bernard |
| 7,379,874 | B2 | 5/2008 | Schmid et al. |
| 7,386,449 | B2 | 6/2008 | Sun et al. |
| 7,392,185 | B2 | 6/2008 | Bennett |
| 7,398,209 | B2 | 7/2008 | Kennewick et al. |
| 7,403,938 | B2 | 7/2008 | Harrison et al. |
| 7,409,337 | B1 | 8/2008 | Potter et al. |
| 7,415,100 | B2 | 8/2008 | Cooper et al. |
| 7,426,467 | B2 | 9/2008 | Nashida et al. |
| 7,447,635 | B1 | 11/2008 | Konopka et al. |
| 7,454,351 | B2 | 11/2008 | Jeschke et al. |
| 7,475,010 | B2 | 1/2009 | Chao |
| 7,478,089 | B2 | 1/2009 | Henkin et al. |
| 7,483,894 | B2 | 1/2009 | Cao |
| 7,502,738 | B2 | 3/2009 | Kennewick et al. |
| 7,526,466 | B2 | 4/2009 | Au |
| 7,535,997 | B1 | 5/2009 | McQuaide, Jr. et al. |
| 7,539,656 | B2 | 5/2009 | Fratkina et al. |
| 7,546,382 | B2 | 6/2009 | Healey et al. |
| 7,548,895 | B2 | 6/2009 | Pulsipher |
| 7,548,915 | B2 * | 6/2009 | Ramer et al. ............... 705/14.54 |
| 7,599,918 | B2 | 10/2009 | Shen et al. |
| 7,620,549 | B2 | 11/2009 | Di Cristo et al. |
| 7,627,130 | B2 * | 12/2009 | Mellot ............... 381/108 |
| 7,634,409 | B2 | 12/2009 | Kennewick et al. |
| 7,640,160 | B2 | 12/2009 | Di Cristo et al. |
| 7,649,877 | B2 | 1/2010 | Vieri et al. |
| 7,664,516 | B2 * | 2/2010 | Levi et al. ............... 455/466 |
| 7,684,985 | B2 | 3/2010 | Dominach et al. |
| 7,693,720 | B2 | 4/2010 | Kennewick et al. |
| 7,702,500 | B2 | 4/2010 | Blaedow |
| 7,707,027 | B2 | 4/2010 | Balchandran et al. |
| 7,707,267 | B2 | 4/2010 | Lisitsa et al. |
| 7,711,672 | B2 | 5/2010 | Au |
| 7,716,056 | B2 | 5/2010 | Weng et al. |
| 7,720,674 | B2 | 5/2010 | Kaiser et al. |
| 7,725,307 | B2 | 5/2010 | Bennett |
| 7,729,916 | B2 | 6/2010 | Coffman et al. |
| 7,734,461 | B2 | 6/2010 | Kwak et al. |
| 7,752,152 | B2 | 7/2010 | Paek et al. |
| 7,783,486 | B2 | 8/2010 | Rosser et al. |
| 7,809,570 | B2 | 10/2010 | Kennewick et al. |

(56) References Cited

U.S. PATENT DOCUMENTS

| | | | |
|---|---|---|---|
| 7,818,176 B2 | 10/2010 | Freeman et al. | |
| 7,822,608 B2 | 10/2010 | Cross, Jr. et al. | |
| 7,840,400 B2 | 11/2010 | Lavi et al. | |
| 7,865,394 B1* | 1/2011 | Calloway et al. | 705/14.4 |
| 7,873,519 B2 | 1/2011 | Bennett | |
| 7,873,654 B2 | 1/2011 | Bernard | |
| 7,881,936 B2 | 2/2011 | Longe et al. | |
| 7,917,367 B2 | 3/2011 | Di Cristo et al. | |
| 7,917,497 B2 | 3/2011 | Harrison et al. | |
| 7,920,678 B2 | 4/2011 | Cooper et al. | |
| 7,930,168 B2 | 4/2011 | Weng et al. | |
| 7,949,529 B2 | 5/2011 | Weider et al. | |
| 7,962,604 B1* | 6/2011 | Morris et al. | 709/224 |
| 7,970,891 B1* | 6/2011 | Kontothanssis et al. | 709/224 |
| 7,974,844 B2 | 7/2011 | Sumita | |
| 7,983,917 B2 | 7/2011 | Kennewick et al. | |
| 7,983,997 B2 | 7/2011 | Allen et al. | |
| 7,987,151 B2 | 7/2011 | Schott et al. | |
| 8,000,453 B2 | 8/2011 | Cooper et al. | |
| 8,005,679 B2 | 8/2011 | Jordan et al. | |
| 8,015,006 B2 | 9/2011 | Kennewick et al. | |
| 8,041,570 B2 | 10/2011 | Mirkovic et al. | |
| 8,055,708 B2 | 11/2011 | Chitsaz et al. | |
| 8,060,565 B1* | 11/2011 | Swartz | 709/206 |
| 8,069,046 B2 | 11/2011 | Kennewick et al. | |
| 8,073,681 B2 | 12/2011 | Baldwin et al. | |
| 8,082,153 B2 | 12/2011 | Coffman et al. | |
| 8,095,364 B2 | 1/2012 | Longe et al. | |
| 8,107,401 B2 | 1/2012 | John et al. | |
| 8,108,895 B2* | 1/2012 | Anderson et al. | 725/36 |
| 8,112,275 B2 | 2/2012 | Kennewick et al. | |
| 8,156,005 B2 | 4/2012 | Vieri et al. | |
| 8,345,665 B2 | 1/2013 | Vieri et al. | |
| 8,423,412 B2 | 4/2013 | Vieri et al. | |
| 2001/0053996 A1* | 12/2001 | Atkinson | 705/14 |
| 2002/0016735 A1 | 2/2002 | Runge et al. | |
| 2002/0026356 A1* | 2/2002 | Bergh et al. | 705/14 |
| 2002/0062245 A1 | 5/2002 | Niu et al. | |
| 2002/0062393 A1 | 5/2002 | Borger et al. | |
| 2002/0120697 A1 | 8/2002 | Generous et al. | |
| 2002/0152117 A1* | 10/2002 | Cristofalo et al. | 705/14 |
| 2002/0193996 A1* | 12/2002 | Squibbs et al. | 704/260 |
| 2003/0028380 A1 | 2/2003 | Freeland et al. | |
| 2003/0046165 A1* | 3/2003 | Topel | 705/14 |
| 2003/0074252 A1* | 4/2003 | Chandler-Pepelnjak et al. | 705/10 |
| 2003/0100322 A1* | 5/2003 | Jeon | 455/466 |
| 2003/0137515 A1 | 7/2003 | Cederwall et al. | |
| 2003/0144903 A1* | 7/2003 | Brechner et al. | 705/14 |
| 2003/0149572 A1* | 8/2003 | Newton et al. | 705/1 |
| 2004/0054589 A1* | 3/2004 | Nicholas et al. | 705/14 |
| 2004/0073482 A1* | 4/2004 | Wiggins et al. | 705/14 |
| 2004/0078304 A1* | 4/2004 | Gabbard et al. | 705/27 |
| 2004/0131081 A1* | 7/2004 | Bhatia et al. | 370/466 |
| 2004/0181448 A1* | 9/2004 | Hartsman et al. | 705/14 |
| 2004/0186777 A1 | 9/2004 | Margoloff et al. | |
| 2004/0208302 A1 | 10/2004 | Urban et al. | |
| 2005/0010641 A1 | 1/2005 | Staack | |
| 2005/0033771 A1 | 2/2005 | Schmitter et al. | |
| 2005/0068939 A1 | 3/2005 | Bangor et al. | |
| 2005/0071332 A1 | 3/2005 | Ortega et al. | |
| 2005/0086316 A1 | 4/2005 | Chen | |
| 2005/0096979 A1 | 5/2005 | Koningstein | |
| 2005/0136949 A1 | 6/2005 | Barnes, Jr. | |
| 2005/0182675 A1* | 8/2005 | Huettner | 705/14 |
| 2005/0234779 A1* | 10/2005 | Chiu et al. | 705/24 |
| 2006/0026067 A1* | 2/2006 | Nicholas et al. | 705/14 |
| 2006/0047563 A1* | 3/2006 | Wardell | 705/10 |
| 2006/0047568 A1* | 3/2006 | Eisenberg et al. | 705/14 |
| 2006/0074727 A1* | 4/2006 | Briere | 705/8 |
| 2006/0129455 A1 | 6/2006 | Shah | |
| 2006/0136298 A1* | 6/2006 | Klein et al. | 705/14 |
| 2006/0143007 A1 | 6/2006 | Koh et al. | |
| 2006/0143307 A1 | 6/2006 | Codignotto | |
| 2006/0149624 A1* | 7/2006 | Baluja et al. | 705/14 |
| 2006/0167747 A1 | 7/2006 | Goodman et al. | |
| 2006/0248062 A1 | 11/2006 | Libes et al. | |
| 2006/0271442 A1* | 11/2006 | Pfleging et al. | 705/26 |
| 2006/0276208 A1* | 12/2006 | Jain | 455/466 |
| 2006/0281474 A1* | 12/2006 | Domville et al. | 455/466 |
| 2007/0003026 A1 | 1/2007 | Hodge et al. | |
| 2007/0038516 A1 | 2/2007 | Apple et al. | |
| 2007/0046823 A1* | 3/2007 | Jiang | 348/582 |
| 2007/0055529 A1 | 3/2007 | Kanevsky et al. | |
| 2007/0063033 A1* | 3/2007 | Silverbrook et al. | 235/432 |
| 2007/0088556 A1 | 4/2007 | Andrew | |
| 2007/0088801 A1* | 4/2007 | Levkovitz et al. | 709/217 |
| 2007/0094330 A1* | 4/2007 | Russell | 709/206 |
| 2007/0099658 A1* | 5/2007 | Borquez et al. | 455/556.2 |
| 2007/0100648 A1* | 5/2007 | Borquez et al. | 705/1 |
| 2007/0100790 A1 | 5/2007 | Cheyer et al. | |
| 2007/0116190 A1* | 5/2007 | Bangor et al. | 379/52 |
| 2007/0121846 A1 | 5/2007 | Altberg et al. | |
| 2007/0123280 A1* | 5/2007 | McGary et al. | 455/466 |
| 2007/0130014 A1* | 6/2007 | Altberg et al. | 705/14 |
| 2007/0156534 A1* | 7/2007 | Lerner et al. | 705/14 |
| 2007/0162296 A1 | 7/2007 | Altberg et al. | |
| 2007/0198353 A1* | 8/2007 | Behringer et al. | 705/14 |
| 2007/0203987 A1* | 8/2007 | Amis | 709/206 |
| 2007/0239530 A1* | 10/2007 | Datar et al. | 705/14 |
| 2007/0239737 A1* | 10/2007 | Dudley et al. | 707/10 |
| 2007/0276729 A1* | 11/2007 | Freer | 705/14 |
| 2007/0282595 A1 | 12/2007 | Tunning et al. | |
| 2008/0002892 A1* | 1/2008 | Jelonek et al. | 382/224 |
| 2008/0004983 A1* | 1/2008 | Cohn | 705/26 |
| 2008/0010355 A1 | 1/2008 | Vieri et al. | |
| 2008/0015864 A1 | 1/2008 | Ross et al. | |
| 2008/0016109 A1 | 1/2008 | Henkin et al. | |
| 2008/0034032 A1 | 2/2008 | Healey et al. | |
| 2008/0040227 A1* | 2/2008 | Ostermann et al. | 705/14 |
| 2008/0045236 A1 | 2/2008 | Nahon et al. | |
| 2008/0046562 A1 | 2/2008 | Butler | |
| 2008/0077664 A1* | 3/2008 | Vanderbaan et al. | 709/204 |
| 2008/0092182 A1 | 4/2008 | Conant | |
| 2008/0103850 A1* | 5/2008 | Shen | 705/7 |
| 2008/0120112 A1 | 5/2008 | Jordan et al. | |
| 2008/0139306 A1* | 6/2008 | Lutnick et al. | 463/30 |
| 2008/0140657 A1 | 6/2008 | Azvine et al. | |
| 2008/0147380 A1* | 6/2008 | Barliga et al. | 704/9 |
| 2008/0147501 A1* | 6/2008 | Gilliam | 705/14 |
| 2008/0147730 A1* | 6/2008 | Lee et al. | 707/104.1 |
| 2008/0162281 A1* | 7/2008 | Davis et al. | 705/14 |
| 2008/0207182 A1 | 8/2008 | Maharajh et al. | |
| 2008/0221892 A1* | 9/2008 | Nathan et al. | 704/257 |
| 2008/0221903 A1 | 9/2008 | Kanevsky et al. | |
| 2008/0221986 A1* | 9/2008 | Soicher et al. | 705/14 |
| 2008/0221996 A1* | 9/2008 | Lucas et al. | 705/14 |
| 2008/0222030 A1 | 9/2008 | Fischler | |
| 2008/0222254 A1* | 9/2008 | Mukherjee | 709/206 |
| 2008/0228496 A1 | 9/2008 | Yu et al. | |
| 2008/0243619 A1* | 10/2008 | Sharman et al. | 705/14 |
| 2008/0247519 A1 | 10/2008 | Abella et al. | |
| 2008/0255989 A1 | 10/2008 | Altberg et al. | |
| 2008/0262846 A1* | 10/2008 | Burns et al. | 704/260 |
| 2008/0281689 A1* | 11/2008 | Blinnikka et al. | 705/14 |
| 2008/0300961 A1* | 12/2008 | Cawston et al. | 705/10 |
| 2008/0319650 A1* | 12/2008 | Aaltonen et al. | 701/207 |
| 2009/0006145 A1* | 1/2009 | Duggal et al. | 705/6 |
| 2009/0006190 A1* | 1/2009 | Lucash et al. | 705/14 |
| 2009/0006192 A1* | 1/2009 | Martinez et al. | 705/14 |
| 2009/0006343 A1 | 1/2009 | Platt et al. | |
| 2009/0030775 A1 | 1/2009 | Vieri | |
| 2009/0030800 A1 | 1/2009 | Grois | |
| 2009/0058823 A1 | 3/2009 | Kocienda | |
| 2009/0076796 A1 | 3/2009 | Daraselia | |
| 2009/0100049 A1 | 4/2009 | Cao | |
| 2009/0125544 A1 | 5/2009 | Brindley | |
| 2009/0129278 A1* | 5/2009 | Kumar et al. | 370/241 |
| 2009/0150156 A1 | 6/2009 | Kennewick et al. | |
| 2009/0150507 A1 | 6/2009 | Davis et al. | |
| 2009/0158136 A1* | 6/2009 | Rossano et al. | 715/232 |
| 2009/0164441 A1 | 6/2009 | Cheyer | |
| 2009/0171664 A1 | 7/2009 | Kennewick et al. | |
| 2009/0299745 A1 | 12/2009 | Kennewick et al. | |

(56) References Cited

U.S. PATENT DOCUMENTS

| | | | |
|---|---|---|---|
| 2010/0023320 | A1 | 1/2010 | Di Cristo et al. |
| 2010/0042400 | A1 | 2/2010 | Block et al. |
| 2010/0106599 | A1* | 4/2010 | Kohn et al. ............. 705/14.54 |
| 2010/0145700 | A1 | 6/2010 | Kennewick et al. |
| 2010/0204986 | A1 | 8/2010 | Kennewick et al. |
| 2010/0217604 | A1 | 8/2010 | Baldwin et al. |
| 2010/0277579 | A1 | 11/2010 | Cho et al. |
| 2010/0280983 | A1 | 11/2010 | Cho et al. |
| 2010/0286985 | A1 | 11/2010 | Kennewick et al. |
| 2010/0299142 | A1 | 11/2010 | Freeman et al. |
| 2010/0312547 | A1 | 12/2010 | van Os et al. |
| 2010/0318576 | A1 | 12/2010 | Kim |
| 2010/0332235 | A1 | 12/2010 | David |
| 2011/0082688 | A1 | 4/2011 | Kim et al. |
| 2011/0112827 | A1 | 5/2011 | Kennewick et al. |
| 2011/0112921 | A1 | 5/2011 | Kennewick et al. |
| 2011/0119049 | A1 | 5/2011 | Ylonen |
| 2011/0125540 | A1 | 5/2011 | Jang et al. |
| 2011/0131036 | A1 | 6/2011 | Di Cristo et al. |
| 2011/0131045 | A1 | 6/2011 | Cristo et al. |
| 2011/0144999 | A1 | 6/2011 | Jang et al. |
| 2011/0161076 | A1 | 6/2011 | Davis et al. |
| 2011/0175810 | A1 | 7/2011 | Markovic et al. |
| 2011/0184730 | A1 | 7/2011 | LeBeau et al. |
| 2011/0231182 | A1 | 9/2011 | Weider et al. |
| 2011/0231188 | A1 | 9/2011 | Kennewick et al. |
| 2011/0279368 | A1 | 11/2011 | Klein et al. |
| 2011/0306426 | A1 | 12/2011 | Novak et al. |
| 2012/0002820 | A1 | 1/2012 | Leichter |
| 2012/0016678 | A1 | 1/2012 | Gruber et al. |
| 2012/0020490 | A1 | 1/2012 | Leichter |
| 2012/0022787 | A1 | 1/2012 | LeBeau et al. |
| 2012/0022857 | A1 | 1/2012 | Baldwin et al. |
| 2012/0022860 | A1 | 1/2012 | Lloyd et al. |
| 2012/0022868 | A1 | 1/2012 | LeBeau et al. |
| 2012/0022869 | A1 | 1/2012 | Lloyd et al. |
| 2012/0022870 | A1 | 1/2012 | Kristjansson et al. |
| 2012/0022874 | A1 | 1/2012 | Lloyd et al. |
| 2012/0022876 | A1 | 1/2012 | LeBeau et al. |
| 2012/0023088 | A1 | 1/2012 | Cheng et al. |
| 2012/0034904 | A1 | 2/2012 | LeBeau et al. |
| 2012/0035908 | A1 | 2/2012 | LeBeau et al. |
| 2012/0035924 | A1 | 2/2012 | Jitkoff et al. |
| 2012/0035931 | A1 | 2/2012 | LeBeau et al. |
| 2012/0035932 | A1 | 2/2012 | Jitkoff et al. |
| 2012/0042343 | A1 | 2/2012 | Laligand et al. |

FOREIGN PATENT DOCUMENTS

| | | | |
|---|---|---|---|
| EP | 1235396 | A1 | 8/2002 |
| JP | 2000134407 | | 5/2005 |
| KR | 20020004337 | A | 1/2002 |
| WO | 00/19697 | A1 | 4/2000 |
| WO | 0044137 | A1 | 7/2000 |
| WO | 03041364 | A2 | 5/2003 |
| WO | 2005/003920 | A3 | 1/2005 |
| WO | 2005003920 | A2 | 1/2005 |

OTHER PUBLICATIONS

Mobile Advertising Effectiveness: an Exploratory Study; Dimitris Drossos, George M. Giaglis; 2006; 8-pages.*
Rossfrank, "Konstenlose Sprachmitteilungins Festnetz", Dec. 10, 2000, 4 pages, Germany.
Restriction Requirement for U.S. Appl. No. 12/018,889 received from the United States Patent and Trademark Office (USPTO) mailed Aug. 27, 2010, 7 pages.
Non-Final Office Action for U.S. Appl. No. 12/018,889 received from the United States Patent and Trademark Office (USPTO) mailed Sep. 14, 2010, 40 pages.
Final Office Action for U.S. Appl. No. 12/018,889 received from the United States Patent and Trademark Office (USPTO) mailed Feb. 15, 2011, 35 pages.
Non-Final Office Action for U.S. Appl. No. 12/018,889 received from the United States Patent and Trademark Office (USPTO) mailed May 10, 2011, 35 pages.
Final Office Action for U.S. Appl. No. 12/018,889 received from the United States Patent and Trademark Office (USPTO) mailed Sep. 8, 2011, 52 pages.
Non-Final Office Action for U.S. Appl. No. 12/018,889 received from the United States Patent and Trademark Office (USPTO) mailed Jan. 5, 2012, 63 pages.
Final Office Action for U.S. Appl. No. 12/018,889 received from the United States Patent and Trademark Office (USPTO) mailed Apr. 20, 2012, 65 pages.
Notice of Allowance for U.S. Appl. No. 12/018,889 received from the United States Patent and Trademark Office (USPTO) mailed Jun. 4, 2012, 55 pages.
Notice of Allowance for U.S. Appl. No. 12/018,889 received from the United States Patent and Trademark Office (USPTO) mailed Sep. 10, 2012, 62 pages.
Factors That Influence the Effectiveness of Mobile Advertising: The Case of SMS: Dimitris Drossos and George M. Giaglis; 2005; 8 pages.
Mobile Advertising Effectiveness: An Exploratory Study; Dimitris Drossos and George M. Giaglis; 2006; 8 pages.
International Preliminary Examination Report for International Application No. PCT/IT02/00673 mailed Mar. 3, 2004, 11 pages.
Written Opinion for International Application No. PCT/IT02/00673 mailed Dec. 9, 2003, 5 pages.
Written Opinion for International Application No. PCT/IT02/00673 mailed Aug. 14, 2003, 6 pages.
International Search Report for International Application No. PCT/IT02/00673 mailed Mar. 28, 2003, 3 pages.
International Preliminary Report on Patentability for International Application No. PCT/IT2008/000465 mailed Jan. 26, 2010, 7 pages.
International Search Report for International Application No. PCT/IT2008/000465 mailed Nov. 26, 2008, 3 pages.
International Preliminary Report on Patentability for International Application No. PCT/IB2009/050142 mailed Jul. 27, 2010, 11 pages.
International Search Report for International Application No. PCT/IB2009/050142 mailed Sep. 7, 2009, 5 pages.
Cellania, M., "Water Consumption and Olympic Hockey," Retrieved from <<http://www.neatorama.com/2010/03/09/water-consumption-and-olympic-hockey/>>, Mar. 9, 2010, pp. 1-5.

* cited by examiner

Create a message campaign

Name of campaign: Regali e Auguri

Preferred start date and duration: 24/06/2007-30/06/2007

DETERMINE A TARGET

| TARGET SELECT DEMOGRAPHICAL CRITERIA | RATE PER VIEWED MSG |
|---|---|
| Choose gender | 0.05 |
| Choose age range | 0.05 |
| Choose interests | 0.05 |
| Connection type | |
| Influencer? Yes ☐ No ☐ | |
| Keywords within the message exchange? Yes ☐ No ☐ <br><br> Regalo <br> Auguri <br> Fiori | |

Check the potential number of customers you can reach with the campaign in Italy Check 3.914

CREATE A MESSAGE

| CUSTOMIZING FIELDS | Compose the text that will be received in speech format within the message exchange |
|---|---|
| [First name] <br><br> [Last name] <br><br> [Age range] <br><br> [Interests] <br><br> [City] | [Nome], regala un mazzo di fiori alla tua ragazza. A [città], in via Tornabuoni. Una vasta scelta. [Nome], fai sicuramente un regalo indimenticabile. <br><br> THIS MESSAGE WILL BE RECEIVED BY: <br> Owners of: Modem and ADSL |

SELECT A VOICE TO ANNOUNCE YOUR MESSAGE 

FIG. 6

Create a message

Create a: Textmessage | Message and prerecorded voice spot|Message with animated avatar | Video message Example: Here you can send an audio/video file by forwarding the corresponding description to the recipient.

| CUSTOMIZING FIELDS | Add an audio/video spot that will be inserted within the message exchange |
|---|---|
| BACKGROUND COLOR | Select a file [ Gift.wav ▼ ] |
| [ Yellow ▼ ] | Compose a text message: |
| Avatar | [name] Una ventata di energia rinfrescante. Up Bier l'afa dell'estate sarà solo un lontano ricordo. Cosa aspetti , trovi Up Bier in tutte le migliori birrerie Italiane. |
| | If you use a file or videoclip which doesn't come from the text-to-speech conversion, please describe the contents of the recorded file(s) (as they are viewable within the messages) |
| | Una ventata di energia rinfrescante. Bevendo Up Bier l'afa dell'estate sarà solo un lontano ricordo. Cosa aspetti , trovi Up Bier in tutte le migliori birrerie Italiane. |
| | THIS MESSAGE WILL BE RECEIVED BY: Owners of : Adsl (file size 1.5 MB) |

FIG. 7

AUTORESPONDER

My autoresponder campaigns

4 Follow up messages

Instant Message [[name]]For a gift      Message Options:

Day 1: [[name]] , Purchase with discount      Edit I Delete
    Day 2: [[name]]  Special offer      Edit I Delete
    Day 4: [[name]], A special thought      Edit I Delete
          Edit I Delete

Compose an autoresponder message

Title: Gifts

Compose the message

[Name] Per fare regali, puoi rivolgerti a Ponte Vecchio on line, il portale per vendite on-line di numerosi articoli da regalo. Telefonando allo 055-111111, e fornendo il numero di codice del messaggio, potrai avere un buono sconto pari a 10 €uro.

Submit file [_____]

Add message at day [ 5 ]

☐ Add message at day
☐ Issue the message every client connection

FIG. 8

General

Log out
Profile
Archive
Send Message

Money

Account
Buy Credits

Advertise

List Campaigns
Reports
New Campaign
File List
Autoresponder

Administration

Hardware
Geo IP
PHP Info
Price List
Voices
Add Credits
User List en

Report for Campaign: Prova 11 Luglio

Campaign price: 2 credits

Campaign budget: 790 credits

| Daily report | | Location report | |
|---|---|---|---|
| Date | Hits | Location | Hits |
| 2007-07-11 | 7 | - | 16 |
| 2007-07-12 | 1 | IT/Other | 3 |
| 2007-07-13 | 9 | IT/Toscana/Firenze | 74 |
| 2007-07-15 | 3 | IT/Toscana/Livorno | 4 |
| 2007-07-16 | 23 | Ukraine/Misto kyyiv/Kiev | 5 |
| 2007-07-17 | 59 | | |
| Total | 102 | Total | 102 |

Last 30 hits

| | View Map |
|---|---|
| 2007-07- 17 12:54:22 - Ukraine/Misto kyyiv/Kiev<br>2007-07- 17 12:52:53 - It/Toscana/Firenze<br>2007-07- 17 12:51:41 - Ukraine/Misto kyyiv/Kiev<br>2007-07- 17 12:46:49 - Other<br>2007-07- 17 10:16:03 - Other<br>2007-07- 17 10:15:14 - It/Toscana/Firenze<br>2007-07- 17 10:14:02 - It/Toscana/Firenze<br>2007-07- 17 10:12:33 - It/Toscana/Firenze<br>2007-07- 17 10:11:58 - It/Toscana/Firenze<br>2007-07- 17 10:10:54 - It/Toscana/Firenze<br>2007-07- 17 10:07:10 - It/Other<br>2007-07- 17 10:06:21 - It/Other<br>2007-07- 17 10:05:30 - It/Other<br>2007-07- 17 10:04:57 - Other<br>2007-07- 17 09:55:04 - Other<br>2007-07- 17 09:54:02 - Other<br>2007-07- 17 09:48:07 - Other<br>2007-07- 17 09:46:55 - Other | |

FIG. 9

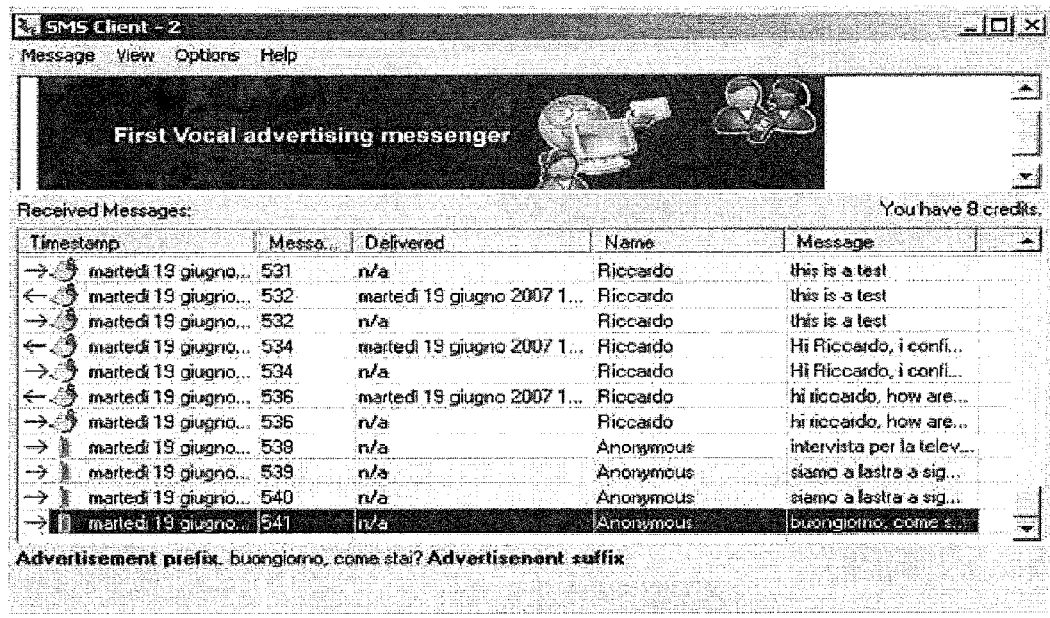
FIG. 10

SYSTEM TO GENERATE AND SET UP AN ADVERTISING CAMPAIGN BASED ON THE INSERTION OF ADVERTISING MESSAGES WITHIN AN EXCHANGE OF MESSAGES, AND METHOD TO OPERATE SAID SYSTEM

I. CLAIM OF PRIORITY

This application is a continuation of, and claims priority from U.S. patent application Ser. No. 12/018,889, filed on Jan. 24, 2008 and entitled "SYSTEM TO GENERATE AND SET UP AN ADVERTISING CAMPAIGN BASED ON THE INSERTION OF ADVERTISING MESSAGES WITHIN AN EXCHANGE OF MESSAGES, AND METHOD TO OPERATE SAID SYSTEM," now U.S. Pat. No. 8,359,234, which claims priority from Italian Patent Application No. FI2007A000177, filed on Jul. 26, 2007, the contents of which are incorporated herein by reference in their entirety.

II. FIELD

The present disclosure is generally related to systems to generate and set up an advertising campaign based on the insertion of advertising messages within an exchange of messages, and methods to operate the systems.

III. DESCRIPTION OF RELATED ART

The advertising world today is experiencing rapid changes. Performance of regular banner advertising is declining and many companies are attracted by new innovative forms of advertising, such as pay per click and pay per call. With such advertising systems, the advertiser pays on any click or phone call generated by people that browse their websites, which are often accessed through search engines. Search engine providers such as Google, Yahoo, and Microsoft are using pay per click with success. An advertiser website is reached by a link that is shown within an ad, generally textual, that is shown to an Internet user when the user is looking for something on the Internet. This system permits more responsive ads and greater click performance creating a competition between advertisers and increasing click rates and advertising revenue.

But, the pay per click and the pay per call systems have several limitations, especially in situations where many advertisers are offering similar products. In these situations, the price per click or price per call becomes very high and limits the exposure of an advertiser. Advertisers in response, often look for copyrighters or agencies to write ads for them, or look for more selective keywords (i.e. lower cost keywords) that reduce many potential targeted Internet surfers. Pay per click is also decreasing in popularity due to an issue of "fraudulent clicks" charged to advertisers. Some analysts have estimated that around half of the money derived from this kind of advertising is generated by fraudulent ads. Reading expert blogs, percentages between 20 and 30% are mentioned and considered to be realistic.

Pay per click advertisers can also present videos to users but there are some limits. Many advertisers do not have videos prepared for display and an Internet surfer may not have the capability (e.g. the proper codec) to display the video spots on the operative system of the user.

Another growing advertising system is pay per phone call. It works in a similar manner to pay per click, but people do not click on an exposed ad and a related link. Instead, users make a phone call to a specified number that saves a count of any phone call received that is associated with a paid advertiser. This new advertising method demonstrates that companies are looking worldwide for alternative systems to reach targeted people in a different way.

E-Mail advertising is decreasing day by day. The whole worldwide web is full of undesired e-mails (i.e. spam) and in the U.S., this situation has been defined as "email bankruptcy." New aggressive spam filters and anti-spyware software are reducing the chances that a regular e-mail can arrive at its intended destination.

Short Message Service (SMS) advertising can be effective, but has its limitations. Some statistics show promising redemption for local targets, but the limited space of characters and the very simple manner of showing the ads in a textual way limits international usage and limits mass advertising. Taking a brief look to the telephony world, many companies have tried to let users listen to some ad spots before or after a telephone call, such as when people are on hold during a call to an Interactive Voice Response (IVR) system.

The use of instant messaging is growing and reaching millions of people every day. There are several instant messaging programs, but only a few programs worldwide that are largely used. With software of several mega bytes, users can exchange with each other textual messages, send emoticons, attach pictures and even talk to each other using Voice over Internet Protocol (VoIP) technologies. A limitation of instant messaging is that both users must have instant messaging software installed on their devices.

Italian patent application number FI2007A000121, discloses an integrated system of communication suitable to send textual messages and transform them to audible messages for delivery via a plurality of available devices. This system allows users to experience the concept of vocal messages. Systems that convert textual messages into voice are described in U.S. patent application Ser. Nos. 10/491,797, 11/858,754, and 11/858,775.

Most instant messaging systems, like ICQ, use a technology where messages are sent directly between users and a main server is not involved in this process. The evolution of regular instant messaging systems is represented by a protocol that allows users to see a list of available contacts on-line. However, the major instant messaging systems do not use a system that transforms textual messages sent by users to comprehensive and high quality audible messages. While it is possible that users could exchange textual communications that are received in audible communications, this would likely happen if users have installed on their device one or more text-to-speech (TTS) engines. Since TTS engine manufacturers do not freely provide the use of their best quality working products, the use of TTS software is not widespread amongst instant messaging users.

Permission marketing is centered around obtaining customer consent to receive information from a company. Permission marketing is about building an ongoing relationship of increasing depth with customers, something like "turning strangers into friends, and friends into customers." Permission marketing is not so effective with Internet users yet. Attempts to apply permission marketing to SMS, search engine advertising, and e-mail marketing have not matched the desired results.

There is a growing need for a system that will allow Internet advertisers to reach potential customers with new media, reaching them locally, and beyond traditional systems like radio, print, e-mail, SMS, television channels, and search engines. There is a need for a system that allows advertisers to plan an advertising campaign using audio/video automatically and without investing large amounts of money to produce ad spots or to require the use of copyrighters.

There is a need for a system that operates differently from the auction method, where the best offer wins, but the regular click price increases. There is a need for a system that creates interactivity with the destination user using audio and video, such that the final user will understand and have full comprehension of the advertising message. There is a need for the audible message to be of high quality.

IV. SUMMARY

This disclosure relates to the technical sector of advertising and communication, and particularly to Internet advertising and instant messaging. The system provides targeted advertising within an exchange of messages between mutual agreed users.

This disclosure describes a system to add one or more vocal advertising communications within an exchange of messages using an instant messaging system. This instant messaging system can send textual messages that reach the destination in a high quality audible form, and the system allows different devices to interact with each other, such as personal computer (PC)/PC, mobile/mobile, personal digital assistant (PDA) with PDA and much more.

This disclosure relates to a system of communication that allows an advertiser to plan and send targeted advertising in audible format to users during an exchange of messages, outside of conventional advertising channels.

This disclosure also aims to allow the advertiser to produce an effective advertisement with audio, colors and good quality graphics, without needing technical expertise in this field, thus saving time and money as compared to traditional methods. Also, the effectiveness of the advertising campaign is fully measurable and can be provided to the advertiser through media, such as a personal computer (PC), SMS, or though a standard telephone connection.

This disclosure also aims to let users exchange audible messages without requiring installation of client side TTS engines. The audible messages will be very effective, free of grammar mistakes, and composed by a plurality of voices.

This disclosure offers benefits to both advertisers and end users. The disclosed instant messaging system will provide value-add and free benefits to the user, and will allow the advertiser to target a very selective group of people in an effective way.

Ads reaching the final users represent a new method of communication. The advertiser can specify to address advertising only to people browsing using a Digital Subscriber Line (DSL) connection, dial up or some other connection, saving time and money. Thus, the low redemption of ads including video by users connected through dial up or a very slow DSL connection can be avoided.

This disclosure addresses generating a customized message to the final user. For example, a vocal advertising message can be added during the exchange of communication and may include the correct name of the user and describe vocally the content of the communication. Advertising may be more effective if customized by using merged field systems. For example, one user (e.g. Riccardo) writes asking a friend for a suggestion for a gift to his girlfriend using the disclosed system. Imagine the surprise when in the reply message of his friend, Riccardo receives a visible and audible ad that talks to him reciting, "Riccardo, do you need a romantic gift for your girlfriend? In Florence, visit 'Dreaming Gifts' on the old bridge and you'll find what you're looking for."

This disclosure aims to improve upon mail autoresponders. Spam is playing a large role in the life of Internet users. The disclosed system provides a valid alternative to the mail autoresponder marketing system. With this system, a user that receives advertising within one exchange of messaging not only will receive the ad, but will also have the chance to view an attached file, such as a HyperText Markup Language (HTML) form ready to accept instant orders, without risk, as planned by the advertiser from a control panel.

This disclosure provides an automatic process of targeted voice autoresponders. Advertisers can add a form on their website and people interested in requesting information on the website, will fill out a regular form, get a free subscription and automatically receive installed client software that will send them different communications that the advertiser will specify from a control panel, specifying day, content, and hour of delivery.

The disclosed method allows users of the instant messaging system to limit their exposures to the advertising messages, to decide the kinds of advertising to receive, and optionally the ads will give the user benefits for any advertising message that is viewed. For example, the more messages viewed, the more benefits generated. Benefits can be represented by credits to be converted to money, free SMS, free phone calls, points, reward programs, discount cards for shopping, or any combination thereof.

The advertiser can also add a series of symbols and graphical images that represent pre-recorded audible messages. For example, using the symbol "X", the advertising message may recall a sound or a sentence that had been pre-recorded. This can save time, money, and provide effective audible advertising by combining a standard pre-recorded message with another file that is converted into the audible message.

The disclosed system allows an advertiser from any part of the world to immediately start using a custom advertising campaign through a control panel.

The disclosed system also allows the advertiser to target ads during the exchange of messages between people belonging to particular groups, such as schoolmates, those dating, and relatives. This type of targeted ad content is to provide better redemption results.

Regarding SMS sending, the system finds an interesting alternative to attract users and advertisers. Inserting advertising during one exchange of SMS may not be effective in some cases because there is not enough space to show the advertising. The disclosed system addresses this problem, such that when one user sends an SMS to another user, the SMS will be delivered to the final destination via a server where the SMS includes a code that identifies the message. The destination user at this point can call a phone number, enter the received code, and listen to the message addressed to the user that is delivered in an audible form with the desired audible advertising inside.

The disclosed method also will provide benefits to advertisers. For example, users can vote for the quality of the ads and can send messages to the advertisers, such that advertisers receive feedback in their reserved area.

In one embodiment, a system is disclosed that includes a message receiving module to receive message data from a first remote device. The message data is associated with a message and the message includes text. The system also includes an advertisement composition module to determine an intended recipient of the message, parse the message data to identify text that matches criteria associated with an advertisement campaign, and compose an advertisement based on characteristics of the intended recipient, the text that matches the criteria associated with the advertisement campaign, or any combination thereof. Further, the system includes a text-to-speech module to create an audio file based on the message data and the advertisement. Additionally, the system includes a message delivery module to send the audio file to a second remote device, where the second remote device is associated with the intended recipient.

In another embodiment, a device is disclosed that includes a display device and one or more audio devices. The device also includes a graphical user interface module that is adapted to receive message data via a first graphical user interface, where the message data is associated with a first text message. The graphical user interface module is also adapted to receive recipient data via the first graphical user interface, where the recipient data is associated with one or more intended recipients of the first message and to present a second message via the display device, where the second message is associated with a text file received from a server. Additionally, the graphical user interface module is adapted to present an advertisement via the display device while presenting the second message, where the advertisement is associated with the text file. Further, the device includes an audio module that is adapted to receive an audio file from the server, where the audio file is associated with the text file and the audio file includes a message portion related to the second message and an advertisement portion related to the advertisement. The audio module is also adapted to provide the message portion of the audio file and the advertisement portion of the audio file via the one or more audio devices while presenting the second message and the advertisement.

In another embodiment, a method is disclosed that includes receiving message data at a server from a first remote device. The message data is associated with a message and the message includes text of one or more words, one or more characters, one or more symbols, or any combination thereof. The method also includes determining an intended recipient of the message and parsing the message data to identify text that matches criteria associated with an advertisement campaign. Additionally, the method includes composing an advertisement based on characteristics of the intended recipient, based on the text that matches the criteria associated with the advertisement campaign, or any combination thereof. Further, the method includes creating an audio file based on the message data and the advertisement and sending the audio file from the server to a second remote device, where the second remote device is associated with the intended recipient.

In another embodiment, a method is disclosed that includes receiving first advertisement data at a server from an advertiser. The first advertisement data is associated with first advertisement text of a first advertisement. The method also includes receiving message data at the server from a first remote device, where the message data is associated with message text of a message. Further, the method includes creating a first text file including an advertisement portion and a message portion. The advertisement portion includes the first advertisement text and includes personal data of a recipient of the message and the message portion is based on the message data. Additionally, the method includes sending a first audio file from the server to a second remote device. The first audio file includes a first portion based on the advertisement portion of the first text file and a second portion based on the message portion of the first text file, where the second remote device is associated with the recipient of the message.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIG. 6 is a graphical user interface to generate and set up an advertising campaign based on the insertion of advertising messages within an exchange of messages;

FIG. 7 is a second graphical user interface to generate and set up an advertising campaign based on the insertion of advertising messages within an exchange of messages;

FIG. 8 is a third graphical user interface to generate and set up an advertising campaign based on the insertion of advertising messages within an exchange of messages;

FIG. 9 is a graphical user interface of a report for an ongoing advertising campaign;

FIG. 10 is a graphical user interface of a software tool available to a user to exchange messages;

VI. DETAILED DESCRIPTION

Figure 1:
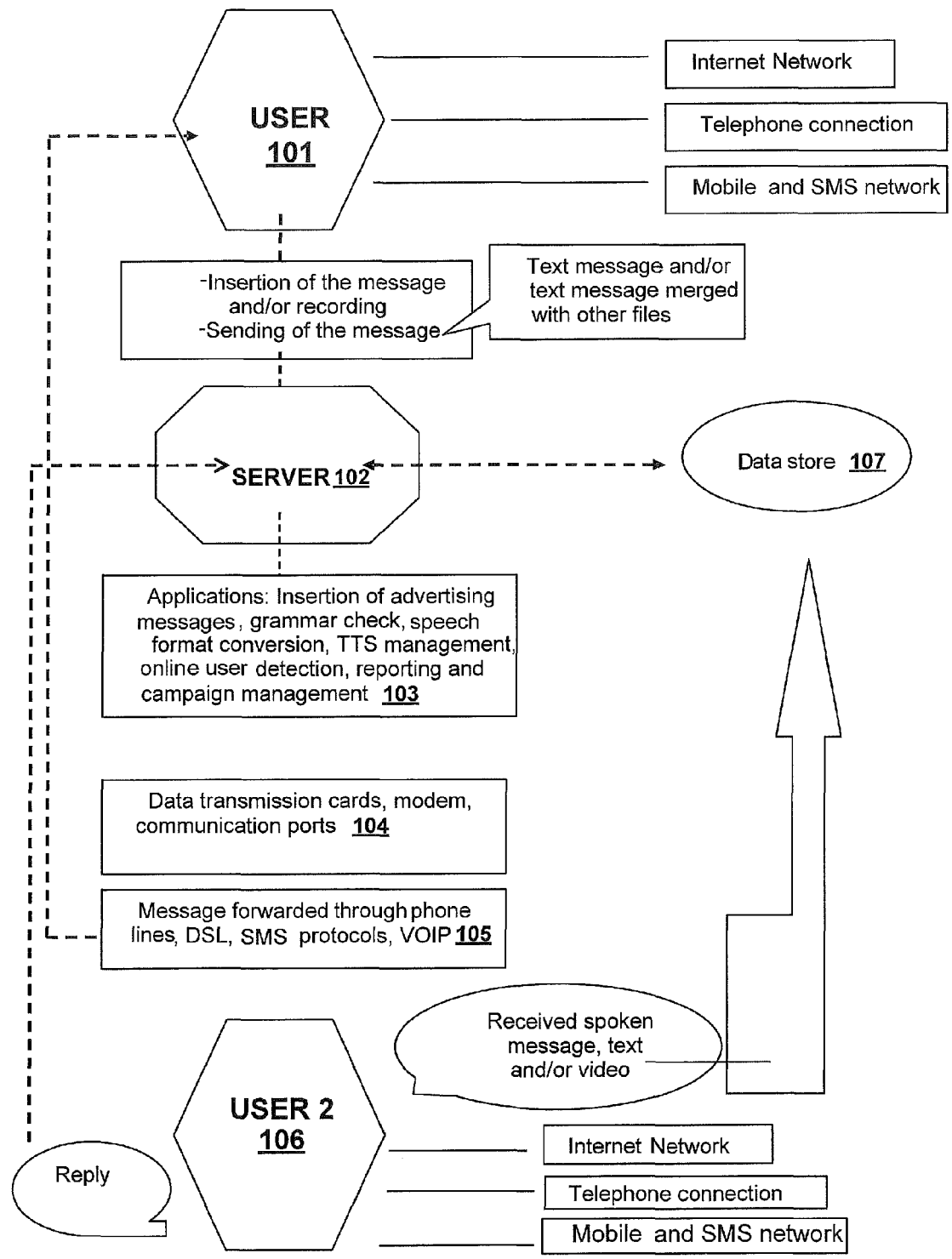
FIG. 1 is a diagram that illustrates an embodiment of a system and method of generating and setting up an advertising campaign based on the insertion of advertising messages within an exchange of messages.

FIG. 1 is a diagram showing an embodiment of a system and method of generating and setting up an advertising campaign based on the insertion of advertising messages within an exchange of messages, where a user 101 inputs and transmits a text message, alone or in combination with other files, to a server 102 through the Internet, a telephone line and/or a mobile network. The text message may include one or more words, one or more characters, one or more symbols, or any combination thereof. The server 102 includes applications 103 which can insert an advertising message created by an advertiser according to certain criteria into the text message, merge the text message with other files, enable and manage the conversion of the text message to a speech format, and enable and create feedback for the advertiser. The processed message is then transmitted through data transmission devices 104 and output channels 105 to a second user 106 connected to the Internet. The message to be received by the second user 106 is stored on a data storage device 107 of the server 102. The second user 106 replies with another message which is sent back to the user 101 through the server 102.

Figure 2:
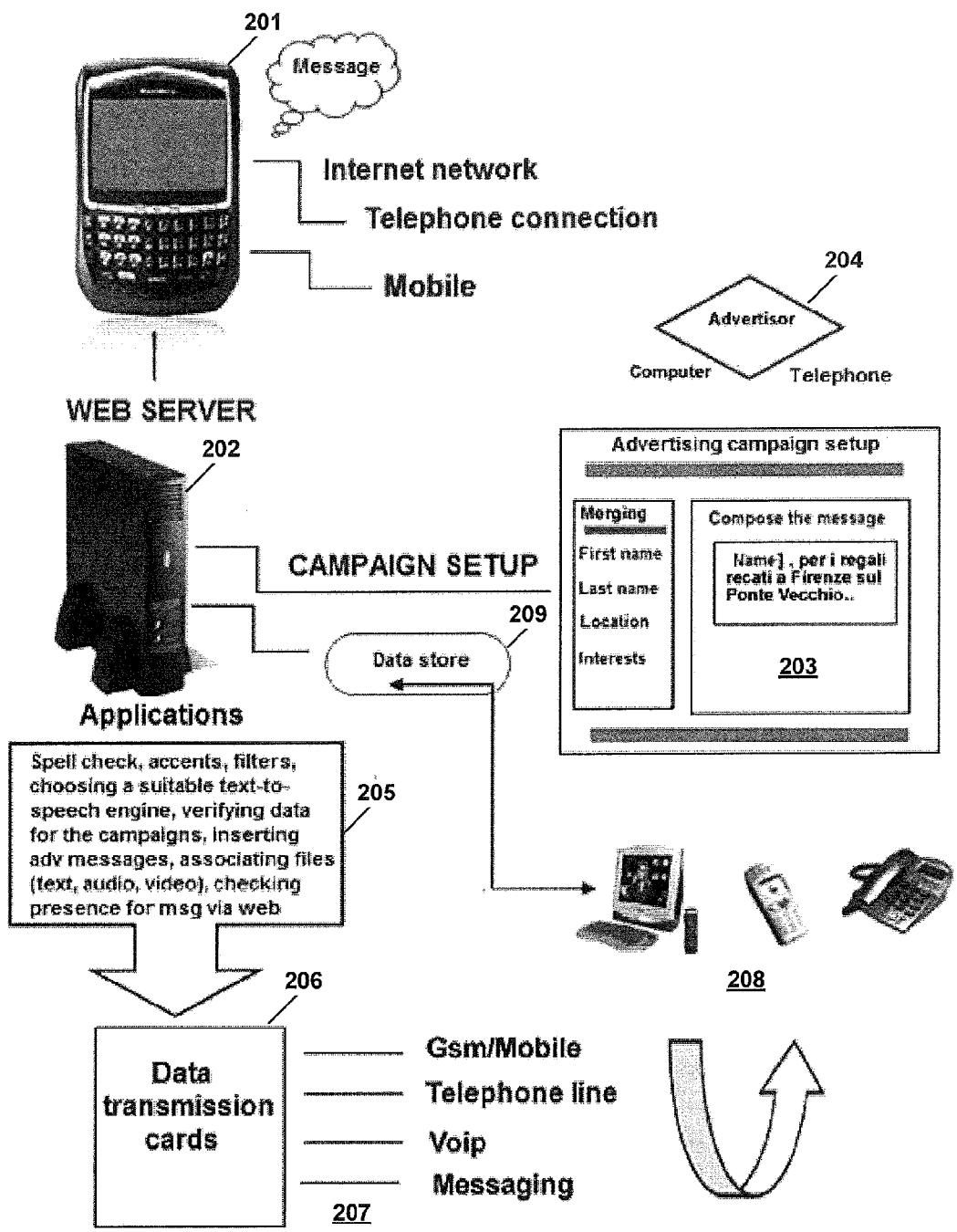
FIG. 2 is a diagram that illustrates operation of an embodiment of a system to set up an advertising campaign based on the insertion of advertising messages within an exchange of messages.

FIG. 2 describes the overall operation of a system to generate and set up an advertising campaign based on the insertion of advertising messages within an exchange of messages. By using a personal digital assistant (PDA), telephone, or personal computer (PC) 201 connected to the Internet through an SMS (Short Message Service) network or a telephone line, a user composes and sends a message to a server 202. The server 202 had been previously setup with an advertising campaign through a graphical user interface 203 to which the advertiser 204 is connected via computer or telephone. Applications 205 compose and define the final message, which is then forwarded 207 to a recipient 208 through data transmission cards 206. The message reaches the recipient 208 and it is stored on a data storage device 209 of the server 202, where it can be retrieved.

Figure 3:
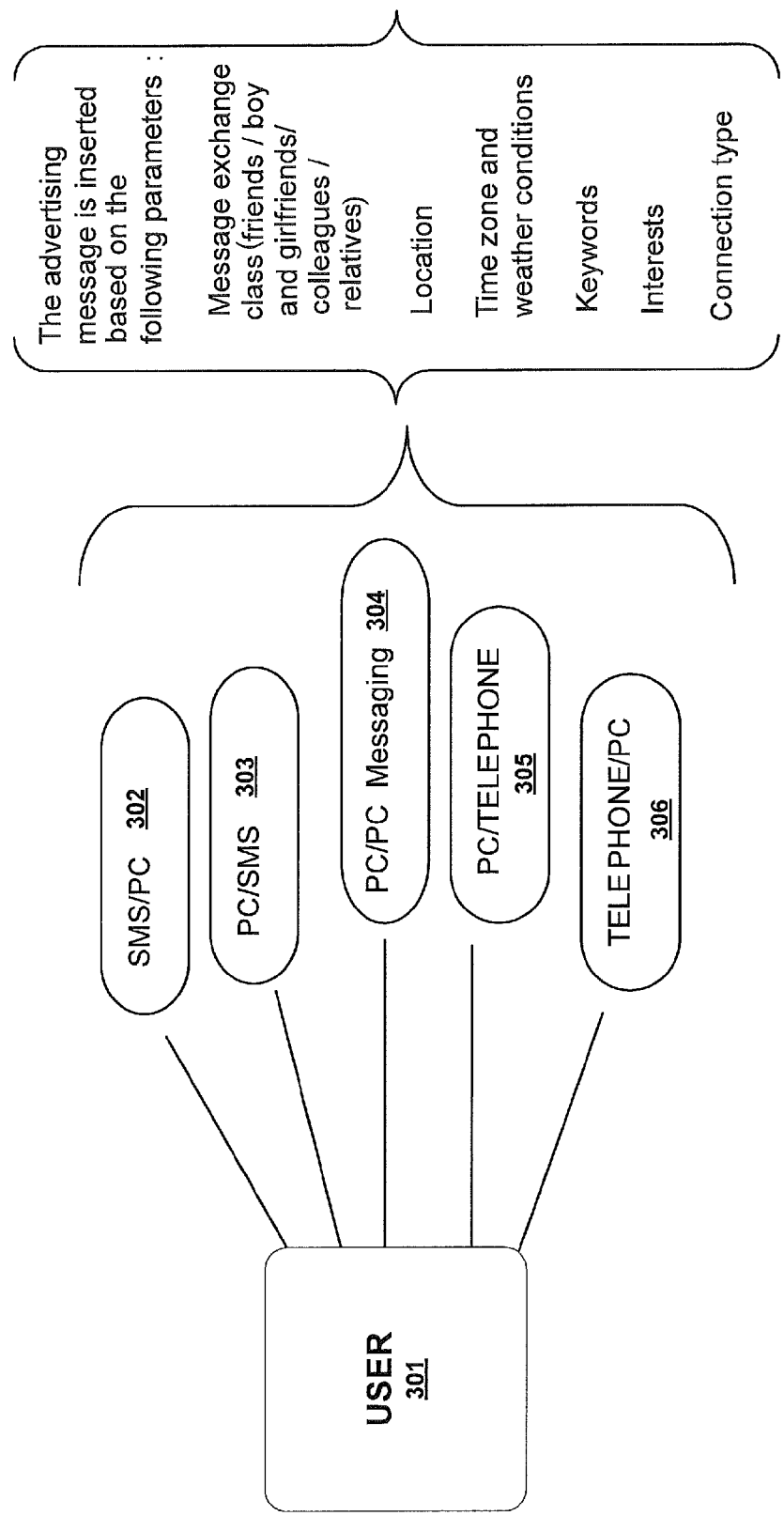
FIG. 3 is a diagram that illustrates an embodiment of a system to insert an advertising message during an exchange of messages.

FIG. 3 illustrates how an advertising message is inserted during an exchange of messages. A user 301 sends a message, such as an email message, an instant message, an SMS message, a multimedia messaging service (MMS) message, or any other type of message including text, video, audio, or any combination thereof, by various methods. In the present example, the message is sent through an SMS-enabled device to a PC 302, through a PC to an SMS-enabled device 303, through a PC to another PC 304, through a PC to a telephone and/or PDA 305, or through a telephone and/or PDA to a PC 306. Another file and/or message is added to the original message based on criteria established by the advertiser. FIG. 3 indicates illustrative parameters that are useful in determining an advertising target of an advertising campaign, such as a message exchange class, the geographical location of the users, the time zone and weather conditions, keywords, interests, and type of connection to the Internet.

Figure 4:
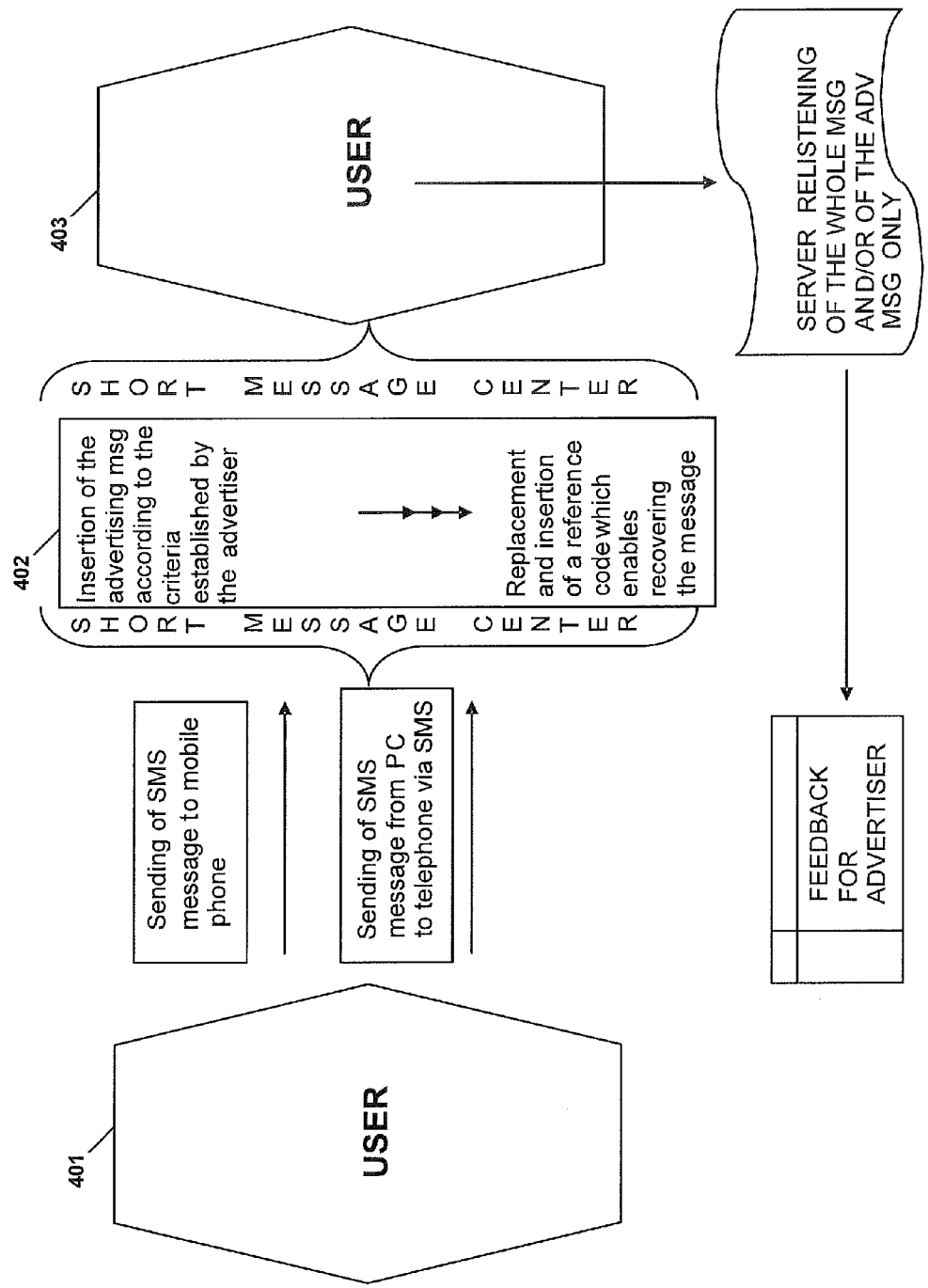
FIG. 4 is a diagram that illustrates an embodiment of a method of inserting an advertising message within an exchange of SMS messages through a server.

FIG. 4 shows an embodiment of a method of inserting an advertising message within an exchange of SMS messages through the server. Initially, a user 401 transmits an SMS message to a recipient 403 through a server 402 using a Short Message Service Center (SMSC). For the sake of clarity, in the present example, the message is sent to a number associated with a Subscriber Identity Module (SIM) card which is connected to the receiving server through a Global System for Mobile communications/Universal Mobile Telecommunications System (GSM/UMTS) modem. The body of the message includes the nickname and/or user number of the recipient 403. The message is then correctly assigned to the intended recipient 403 along with such instructions. The message also includes an advertisement message therein, such advertisement message being specified by the advertiser. Since SMS messages are limited in number of characters, instead of presenting the original message along with the advertisement message, the user 403 may automatically receive an SMS message containing an identification number. For example, the user 403 may be invited to call a number, where the whole original message or a portion thereof can be recovered. The user 403 can employ the received identification number to an Interactive Voice Response (IVR) system, which will provide the message from the sender 401 and the attached advertisement message according to the criteria of the advertising campaign. The advertiser can query the server 402 remotely through various available connections and devices to consult advertising feedback reports.

Figure 5:
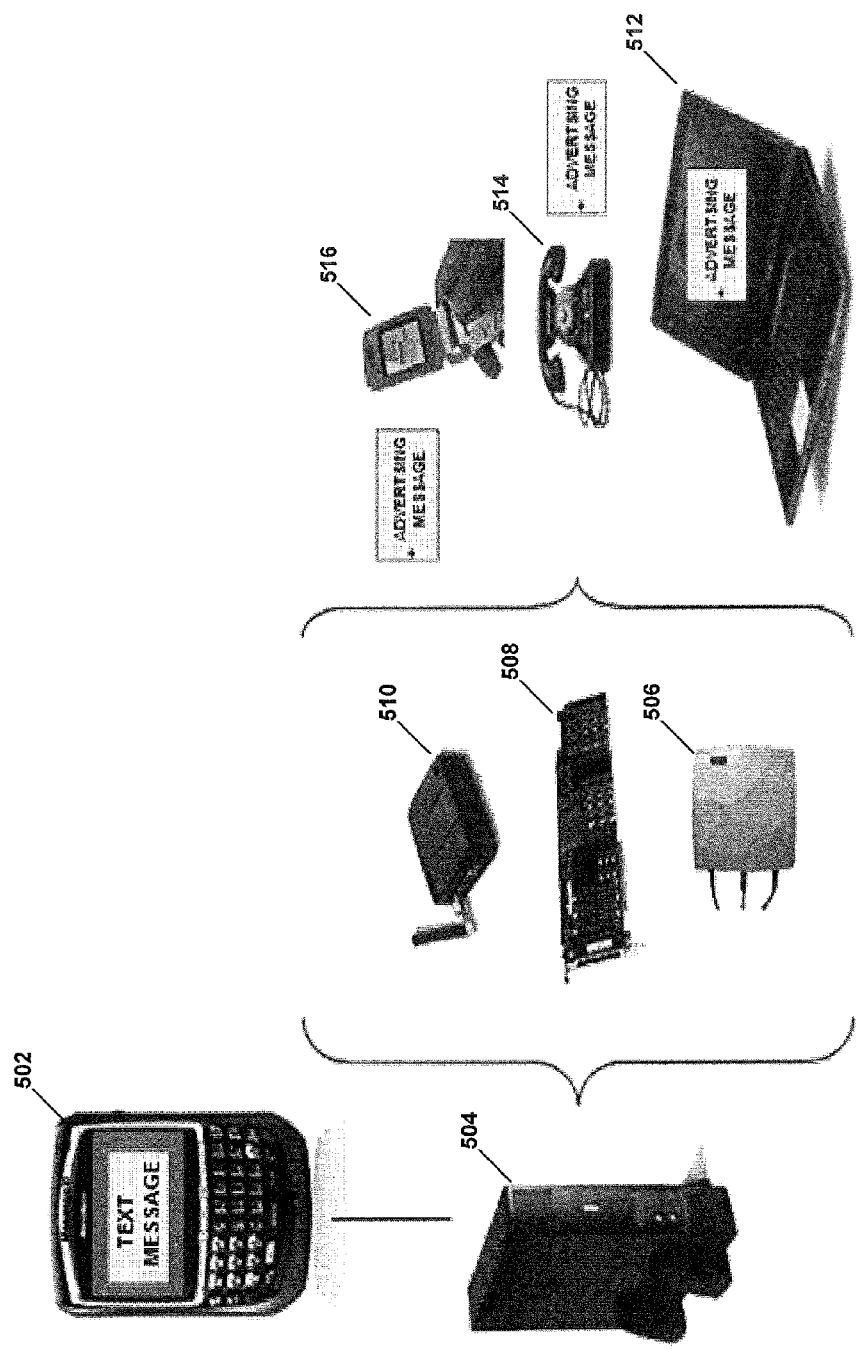
FIG. 5 is a diagram that illustrates an embodiment of hardware components involved in an exchange of text messages to include suitable advertising messages according to criteria established by the advertiser.

FIG. 5 shows an example of hardware components that can be involved in an exchange of text messages, that can be used to include suitable advertising messages into a text message according to criteria established by the advertiser, that can be used to convert the text message to a speech format, that can be used to send the converted message to a recipient, and that can be used to receive the converted message at the recipient side. The hardware components shown in FIG. 5 represent only one of many possible embodiments and are not intended to limit the hardware components that can be used to generate and set up an advertising campaign based on the insertion of advertising messages within an exchange of messages. The hardware components shown in FIG. 5 are a palmtop 502 or a server 504 connected to a GSM modem 506, a data transmission card 508, or a Digital Subscriber Line (DSL) modem 510. The message is received by a notebook computer 512, a landline telephone 514, or a mobile telephone 516.

FIG. 6 illustrates a graphical user interface that shows how an advertiser can plan an advertising campaign. The example shows that the advertiser can assign a name to the advertising campaign, set a start date and an end date, select the target criteria for recipients to be reached by the campaign, write an advertisement message, introduce customized fields, and verify a number of users that can be reached with a given message. The advertisement message may include one or more words, one or more characters, one or more symbols, one or more fields, or any combination thereof.

FIG. 7 shows how a pre-recorded or pre-uploaded file can be sent. The message is also described in text form to be understood by the recipient even if the recipient-side hardware components don't include audio capabilities. The example also includes the possibility of choosing a background color for the message which will be displayed by pertinent means along with an avatar image of the recipient. It is noted that the recipient can recover and understand the contents of the spoken message virtually in any situation, since it is also available in text form and therefore visible, recoverable and/or listenable by other means;

FIG. 8 shows another feature of the system, and illustrates a graphical user interface related to an autoresponder system. Through the autoresponder graphical user interface, an advertiser can insert a series of messages and define sending dates, times and priority for the messages, which can be received by users who request information via an Internet form or SMS message. In this way, the message can be converted to speech and, together with any other files specified by the advertiser, the message will be forwarded to the recipient. The advertiser can then consult feedback reports and a summary of the ongoing advertising campaigns for the autoresponder system.

FIG. 9 shows an exemplary report for an ongoing advertising campaign. The advertiser can check the number of hits for a particular day, the number of hits associated with a particular location, and a map showing the geographical location of the users.

FIG. 10 shows how a client, i.e. a software tool available to the device users, can operate to exchange messages. A user can write a message, choose a connection type to send the message, and specify a date and time for the message to be received by the recipient. FIG. 10 also shows that messages can be sequentially displayed in a table, with an icon which is displayed next to each message to indicate that the message has been sent and/or received via PC, telephone or SMS.

Figure 11A:
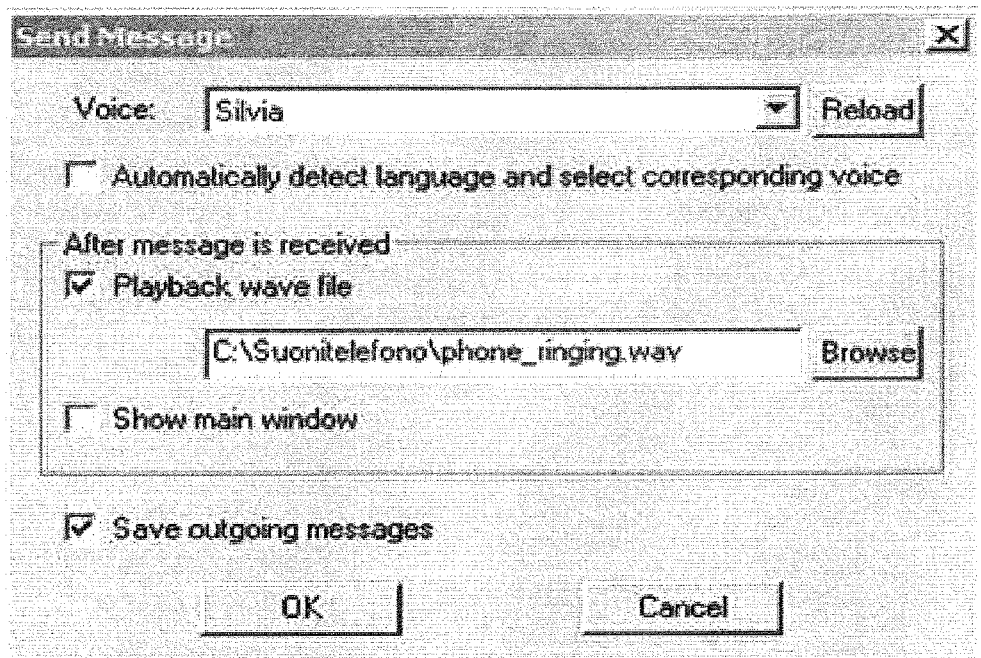
FIG. 11A is a second graphical user interface of a software tool available to a user to exchange messages.

FIG. 11A illustrates a graphical user interface that allows the user to select a particular voice and language to be used in converting the text messages to speech. Optionally, the system can also automatically recognize the appropriate text-to-speech (TTS) engine and language according to the contents of the message. In this way, communication is available between users of different languages by using the appropriate text-to-speech engine. Thus, an Italian text-to-speech engine would not be used to convert a text written in English. The graphical user interface also includes a selectable option related to automatically detecting the language of the text message and selecting a voice that corresponds to the detected language.

Figure 11B:
FIG. 11B is a graphical user interface of an embodiment of an advertising message received by the user.

FIG. 11B shows an alternate embodiment for receiving an advertising message by the recipient. In this case, the message appears on the screen as a non-blockable pop up message with a graphic similar to a reminder note. The received message includes the message of the sender along with the advertisement message inserted by the system. Furthermore, the spoken message is unique and the message can also contain a code number.

Systems to generate and set up an advertising campaign based on the insertion of advertising messages within an exchange of messages, and methods to operate the systems are disclosed. In a particular embodiment, the system includes devices to write and record data, devices to set up an advertising campaign remotely, and devices to define parameters associated with the advertising campaign, such as criteria, duration, costs, target destination, type of message to be sent, structure of a message to be sent and/or other files to be merged with the message. The system may also include devices to choose a connection type by which messages related to the advertising campaign are to be received.

In a particular embodiment, the system includes devices to write, record and send messages through a data entry unit. The data entry unit may be adapted to provide a graphical user interface which makes it possible to write a text message and/or request other files (e.g. video files) to be sent to a recipient, to indicate telephone number(s) of the recipient and/or nickname(s) by which the recipient is recognized by the system, and indicate an address book from which the telephone number(s) of the recipient can be extracted and sent to a central server where such messages are to be received.

In a particular embodiment, the system includes devices to send the messages via an Internet connection, a telephone connection, or an SMS network. Further, the system includes devices to receive and process a text message and other files, with at least one hardware component adapted to receive messages from telephone and/or computer devices. For example, the system may include a hardware component that operates as a server and includes at least one application which can convert a message received by a user to speech through one or more TTS engines. The at least one application may also be adapted to correct and/or eliminate and/or substitute grammatical errors, accents and imperfections to obtain improved phonetic and vocal results. Further, the at least one application may be adapted to allow an advertiser to setup an advertising campaign, associate with and include the advertising message in an exchange of messages according to the geographical location, climatic conditions and time zone of the users, according to the gender and interests of the users, according to keywords that occur in the exchange of messages, according to a topic and/or list type associated to the exchange of messages, or any combination thereof. Additionally, the at least one application may be adapted to modify certain terms and/or words of the advertising message according to the time zone and/or climatic conditions of the geographical area of the users, to modify certain terms and/or words of the advertising message according to the geographical area of the users, to replace certain terms and/or words of the advertising message with more appropriate terms and/or words such as to provide targeted advertising messages, or any combination thereof. Other applications can communicate with devices adapted to receive data related to a message exchange transaction, to manage and store the data related to the transaction, to provide feedback and verification tools to integrate the advertising campaign, and/or to provide reporting tools to the user.

In a particular embodiment, the system also includes devices to send a generated message through vocal data transmission cards and devices to receive the message, where the receiving devices can establish interactions with the server and the sender.

In a particular embodiment, an advertising message, which has been made into a speech format and/or other interpretable, is customized within the exchange of messages between users. For example, the advertising message may include the name, locality and interests of the users for advertising purposes established by the advertiser. Additionally, the message received by the recipient may not only be a spoken message, but the message may also be presented in text form and made visible and interpretable, so as to be understood by the recipient even if the recipient-side hardware components do not include audio capabilities.

In a particular embodiment, the recipient of the message may only receive communications related to a personal profile of the recipient, such that the exposure of the recipient to these messages can be limited and/or reduced. Further, in an illustrative embodiment, more than one advertising message can be inserted within the exchange of messages. For example, a first advertisement message may be inserted as a prefix at the beginning of the message body and a second advertisement message may be inserted as a suffix at the end of the message body. The recipient receives the first advertisement message, the message body, and the second advertisement message as one voice communication, which can also be interpreted and recovered in text form. In an illustrative, non-limiting embodiment, certain portions of a message may be presented to a recipient as audio portions, other portions are presented to a recipient as text, and still other portions may be presented to a recipient as video. For example, the first advertisement message may be presented to a recipient via audio devices, while the message body and the second advertisement message are presented as text. In another example, the first advertisement messages may be presented to the recipient via an audio format, while the message body is presented to the recipient according to a text format, and the second advertisement message is presented to the recipient according to a video format.

In a particular embodiment, the written text and/or the advertising message(s), which have been merged into one final message, are all visible and interpretable with only portions of the final message converted to a speech format.

In a particular embodiment, the contents of a message are converted correctly to a speech format according to the language of the recipient, even if the user does not indicate either the language or a text-to-speech engine suitable for such conversion. In addition, the contents of the text message may be converted to speech using different text-to-speech engines which transform such contents into a single spoken message which is output by a plurality of voices. Further, the contents of the message are converted to a speech format without a client-side TTS engine being installed. In an illustrative embodiment, the text of a message may be analyzed to identify the language of the message and an appropriate text-to-speech engine is used based on the analysis. For example, if text of a particular message is written in German to a client that is configured to receive text in English, then a German text-to-speech engine is utilized to send an audio message to the client in German.

In a particular embodiment, users can exchange messages, an advertising message can be inserted into the exchange of messages, and an application may be adapted to deliver the advertising message to the recipient as long as the hardware of the receiving device of the recipient is not idle. In an illustrative embodiment, the client which is used to send and receive messages is less than 200 kb in size. Further, the exposure of a user to advertising messages can be limited by modifying some aspects of the user profile and modifying specified options through the client.

In a particular embodiment, the advertising campaign can be generated to include promotional messages created according to the speed of the recipient-side Internet connection. Additionally, the advertising campaign can be generated such that the cost for the whole advertising campaign and each exposure can be defined every time during the advertising campaign, even if the advertising campaign is already underway. Further, the advertising campaign can be defined by setting up an autoresponder, through which users interested in receiving information from an Internet site can make a request by way of a form, and receive default messages according to day, date, time, and/or connection priority. The exposure of the message to the same person can be limited to a maximum number of times.

In an illustrative embodiment, when the advertising message has been received, the recipient can interact with the advertiser anonymously. In addition, the advertiser can access data related to the recipient interactions from a reporting section associated with the advertising campaign. The advertiser can also reply to the recipient without knowing either the ID or other personal data of the recipient.

In a particular embodiment, while the advertising message is being edited, the advertiser can insert a plurality of symbols and/or graphical images into the advertising message. The symbols and/or graphical images may be associated with pre-recorded spoken files which will be integrated into the final message.

In a particular embodiment, the exchange of messages can be an exchange of SMS messages. In an illustrative embodiment, an advertising message inserted within the SMS message is made into a speech format and interpretable, such that the message is recoverable by telephone or another device according to an identification code. The criteria used to insert the advertising message in the SMS message can be the same criteria for inserting advertising messages into the exchange of messages according to other formats, such as instant messaging.

In a particular embodiment, the final message is displayed on a recipient-side screen, and the arrival of the final message is announced with a sound which can be configured on the client. The sound can be configured according to the caller and the type of advertising contained within the incoming message.

In a particular embodiment, the file of the final message can be different in volume according to different sections contained therein so as to highlight certain portions thereof, such as the advertising portion. For example, the audio volume associated with advertising portion of the final message file may be louder than the audio volume associated with a message portion of the final message file. In an illustrative embodiment, additional servers can be provided to support a growing number of users. Each server may be configured to send, receive and gather the data related to generating the final messages for one or more specified users.

In a particular embodiment, a method is disclosed that includes inserting and setting up an advertising campaign with defined criteria and rules to display the advertising communications within an exchange of messages between users. As part of the advertising campaign, an advertiser may choose a target, geographical location, time zone, weather conditions, interests, profile, social class, or any combination thereof, related to receiving an advertisement message. In addition, an advertiser may customize communication with users by merging an advertisement within an exchange of messages. For example, an advertising campaign may allow an advertiser to select backgrounds, sounds, avatars and options among a plurality of templates to create the most effective message for the advertiser's purposes. The cost and duration of each displayed message can be defined during the advertising campaign. Further, the advertising campaign may be associated with applications to write a plurality of default messages which are sent to the recipients through an autoresponder according to given criteria that are established by the advertiser.

In a particular embodiment, a method is disclosed that includes receiving the messages exchanged between users on at least one server and checking spelling, spaces, accents and lexical aspects, and correcting the message to obtain a more effective spoken message, if necessary. Further, the method may include applying criteria to insert the advertising message(s) and or file(s) within the exchange of messages according to the geographical location, climatic conditions and time zone of the recipient, according to keywords that occur in the exchange of messages, according to a message exchange class, according to a user profiling model, or any combination thereof. Certain words in the advertising message can be replaced with other words which are more effective in certain geographical locations because they are used more frequently by the local inhabitants and/or because a marketing study indicates that such other words are more penetrative in terms of advertising.

In a particular embodiment, a method is disclosed that includes associating a text file with one or more suitable text-to-speech engines, merging the message with files or images, if any, and using one or more server-side text-to-speech engines to convert the text message to speech format. Additionally, a method is disclosed that includes interacting with a data transmission card, sending the message to the recipient(s), and recording and storing transaction data on a server-side database.

In a particular embodiment, messages sent by a user, received by a user, or any combination thereof, are shown in a window of a graphical user interface. The window may include a table that allows a user to scroll through the messages. In an illustrative embodiment, the messages may be audible during the scrolling and different sections of a received message may be associated with different colors to highlight their corresponding contents.

In a particular embodiment, the advertising message is displayed in a pop up window which appears in the center of the messaging system of the user.

In a particular embodiment, credits may be assigned to a user for each advertising message received, such credits giving benefits to the user including, free sending of SMS messages, prizes, other benefits, or any combination thereof. Further, a score may be assigned to the advertiser for each advertising message received by the user. The score may provide benefits to the advertiser, such as a higher priority compared to competitors and credits to be used for extra advertising messages.

Although the systems to generate and set up an advertising campaign based on the insertion of advertising messages within an exchange of messages and methods to operate the systems have been described with reference to many specific embodiments thereof, it is to be understood that the systems and methods are not limited to these embodiments, which are merely illustrative of some technical improvements of embodiments of systems to generate and set up an advertising campaign based on the insertion of advertising messages within an exchange of messages and corresponding methods to operate the systems. The disclosed systems and methods can be used with various devices and allows advertisers to explore new paths to implement targeted advertising campaigns. Numerous industrial applications can be realized on a large scale and worldwide.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and features have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods or algorithms described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electronically erasable programmable read-only memory (EEPROM), registers, hard disk, a removable disk, a compact disc (CD) ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an application specific integration circuit (ASIC). The ASIC may reside in a computing device, a user terminal, or a telephone. In the alternative, the processor and the storage medium may reside as discrete components in a computing device, user terminal, or telephone.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from scope of the disclosure. Thus, the present disclosure is not intended to be limited to the embodiments shown herein but is to be accorded the widest scope possible consistent with the principles and features as defined by the following claims.

What is claimed is:

1. A method, comprising:
receiving, message data at a server from a first remote device, the message data associated with a message to a second remote device, the message including text;
parsing, by at least one processor of the server, the message data to identify information associated with an advertisement of an advertisement campaign, wherein the advertisement includes advertisement text and a graphical image that corresponds to a pre-recorded audio message;
generating, by the at least one processor of the server, an audio file based on the message data, the advertisement text, and the pre-recorded audio message; and
sending the audio file from the server to the second remote device.

2. The method of claim 1, wherein the advertisement is identified based at least in part on a location of the second remote device.

3. The method of claim 2, further comprising replacing a first word included in the advertisement with a second word, wherein the second word is more effective for marketing purposes than the first word at the location.

4. The method of claim 2, wherein an intended recipient of the message is identified based on information received from a service provider, information from the first remote device, or any combination thereof.

5. The method of claim 4, further comprising generating a first text file including an advertisement portion and a message portion, wherein the advertisement portion includes the advertisement text and includes personal data of the intended recipient, and wherein the message portion is generated based on the message data.

6. The method of claim 5, further comprising sending the first text file to the second remote device.

7. The method of claim 1, wherein generating the audio file based on the message data and the advertisement text includes performing a text-to-speech conversion of at least a portion of the message data, at least a portion of the advertisement text, or a combination thereof.

8. The method of claim 1, further comprising:
receiving feedback related to the advertisement from the second remote device at the server;
providing the feedback to an advertiser.

9. The method of claim 8, wherein the feedback provided to the advertiser includes map information that indicates a geographical location of the second remote device.

10. A system, comprising:
a processor;
a message receiving module executable by the processor to receive message data from a first remote device, the message data associated with a message that includes text;
an advertisement module executable by the processor to parse the message data to identify information associated with an advertisement of an advertisement campaign, wherein the advertisement includes advertisement text and a graphical image that corresponds to a pre-recorded audio message;
an audio file generation module executable by the processor to:
generate audio data based on the message data and the advertisement text,
wherein the audio data is generated using text-to-speech conversion; and
integrate the pre-recorded audio message with the audio data to generate an audio file; and
a message delivery module executable by the processor to send the audio file that includes the pre-recorded audio message to a second remote device.

11. The system of claim 10, wherein the advertisement module is further executable by the processor to determine a location of the second remote device and wherein the advertisement is selected based at least in part on the location of the second remote device.

12. The system of claim 11, wherein the advertisement module is further executable by the processor to determine an internet connection speed of the second remote device, and wherein the message delivery module is further executable by the processor to determine whether to send a video file to the second remote device based on the internet connection speed of the second remote device.

13. The system of claim 10, wherein the advertisement module is further executable by the processor to detect a language associated with the message data.

14. The system of claim 13, wherein the text-to-speech module is further executable by the processor to create the audio file based on a voice associated with the language.

15. The system of claim 10, wherein the message receiving module is configured to communicate with the first remote device, the second remote device, or any combination thereof, via a short message service (SMS) network, an Internet Protocol (IP) network, a public switched telephone network (PSTN), a multimedia messaging service (MMS) network, or any combination thereof.

16. An apparatus comprising:
a processor;
a user input device;
a speaker;
a transmitter;
an antenna coupled to the transmitter; and
a memory comprising instructions that, when executed by the processor, cause the processor to:
receive an audio file from a server, wherein the server generates the audio file based on message data received at the server from a first remote device and based on an advertisement associated with an advertisement campaign, wherein the advertisement includes advertisement text and a graphical image that corresponds to a pre-recorded audio message, and wherein the server generates the audio file by performing a text-to-speech conversion of the advertisement text to generate audio data and integrating the pre-recorded audio message with the audio data; and
initiate playback of the audio file via the speaker.

17. The apparatus of claim 16, further comprising a rechargeable battery.

18. The apparatus of claim 16, wherein the message data is associated with a message that includes text, and wherein the memory further comprises instructions that, when executed by the processor, cause the processor to:
present the text included in the message, the advertisement text, or both at a display;
receive input via the user input device; and
transmit a message to the server via the transmitter and the antenna in response to the input, wherein the message is associated with a request for additional information associated with a product or service corresponding to the advertisement.

19. The apparatus of claim 16, wherein the memory further comprises instructions that, when executed by the processor, cause the processor to transmit a request to the server via the transmitter and the antenna in response to input received via the user input device, wherein the request corresponds to a request to receive additional advertisements from the server, wherein the additional advertisements are associated with an autoresponder cycle.

20. The apparatus of claim 19, wherein the memory further comprises instructions that, when executed by the processor, cause the processor to transmit a second request to the server via the transmitter and the antenna in response to second input received via the user input device, wherein the second request corresponds to a request to stop receiving the additional advertisements associated with the autoresponder cycle.

* * * * *